United States Patent
Yamada et al.

(10) Patent No.: US 9,366,243 B2
(45) Date of Patent: Jun. 14, 2016

(54) MOTOR-DRIVEN COMPRESSOR AND MOUNTING METHOD FOR MOTOR-DRIVEN COMPRESSOR

(75) Inventors: Tetsuya Yamada, Kariya (JP); Yoshikazu Fukutani, Kariya (JP); Shingo Enami, Kariya (JP); Ken Suitou, Kariya (JP); Hiroshi Fukasaku, Kariya (JP); Minoru Mera, Kariya (JP); Taku Adaniya, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 882 days.

(21) Appl. No.: 13/371,669

(22) Filed: Feb. 13, 2012

(65) Prior Publication Data
US 2012/0230849 A1    Sep. 13, 2012

(30) Foreign Application Priority Data

Mar. 8, 2011   (JP) .................................. 2011-050377
Oct. 18, 2011  (JP) .................................. 2011-229132

(51) Int. Cl.
| | |
|---|---|
| *F04C 18/02* | (2006.01) |
| *H02K 3/50* | (2006.01) |
| *H02K 5/22* | (2006.01) |
| *F04B 35/04* | (2006.01) |
| *F04C 23/02* | (2006.01) |
| *F04C 23/00* | (2006.01) |

(52) U.S. Cl.
CPC .............. *F04B 35/04* (2013.01); *F04C 18/0215* (2013.01); *F04C 23/02* (2013.01); *H02K 3/50* (2013.01); *H02K 5/225* (2013.01); *F04C 18/0223* (2013.01); *F04C 23/008* (2013.01); *F04C 2240/803* (2013.01); *F04C 2240/808* (2013.01)

(58) Field of Classification Search
CPC ........... H02K 5/22; H02K 5/225; H02K 3/50; F04C 2240/803; F04C 2240/808; F04C 18/0215; F04C 18/0223; F04C 23/008

USPC .................. 417/410.1, 423.14; 310/216.069, 310/216.077, 216.058, 216.129, 310/216.126–216.135, 71

See application file for complete search history.

(56) References Cited

U.S. PATENT DOCUMENTS

| | | | | |
|---|---|---|---|---|
| 4,544,856 | A  * | 10/1985 | King .......................... | H02K 3/50 310/216.129 |
| 6,321,563 | B1 | 11/2001 | Ikeda et al. | |
| 7,501,729 | B2 * | 3/2009 | Takeuchi ......................... | 310/71 |
| 7,663,285 | B2 * | 2/2010 | Yumoto et al. ................. | 310/194 |
| 8,183,728 | B2 * | 5/2012 | Schaflein et al. ............... | 310/71 |
| 8,210,833 | B2 * | 7/2012 | Egawa et al. ............ | 417/423.14 |
| 9,068,563 | B2 * | 6/2015 | Fukasaku ................ | F04B 17/03 |
| 9,194,394 | B2 * | 11/2015 | Yamada .................. | F04C 23/02 |
| 9,234,527 | B2 * | 1/2016 | Fukasaku ............. | F04D 29/5806 |
| 9,243,638 | B2 * | 1/2016 | Mera ........................ | F04C 23/02 |
| 2003/0067243 | A1 * | 4/2003 | Hollenbeck et al. .......... | 310/254 |
| 2003/0201688 | A1 * | 10/2003 | Yamamura et al. ........... | 310/216 |
| 2006/0175917 | A1 * | 8/2006 | Nanbu .................... | H02K 3/522 310/71 |
| 2007/0278871 | A1 * | 12/2007 | Uchiumi ................. | H02K 5/225 310/71 |
| 2009/0304536 | A1 * | 12/2009 | Egawa et al. ............ | 417/423.14 |
| 2011/0012475 | A1 | 1/2011 | Mera et al. | |
| 2011/0020153 | A1 | 1/2011 | Murakami | |

FOREIGN PATENT DOCUMENTS

| | | |
|---|---|---|
| CN | 101958595 A | 1/2011 |
| JP | 51-001338 U | 1/1975 |
| JP | 2000-291557 A | 10/2000 |
| JP | 2000291557 A * | 10/2000 |
| JP | 2005-233072 A | 9/2005 |
| JP | 2006-42409 A | 2/2006 |
| JP | 2010-59809 A | 3/2010 |

* cited by examiner

*Primary Examiner* — Peter J Bertheaud
(74) *Attorney, Agent, or Firm* — Sughrue Mion, PLLC

(57) ABSTRACT

A stator core includes an insertion hole that has an opening in an outer peripheral surface of the stator core and a bent portion in the stator core. A cluster block includes an insertion piece, which is inserted into the insertion hole via the cornered portion. The cluster block is attached to the stator core by engaging the insertion piece with the insertion hole.

20 Claims, 11 Drawing Sheets

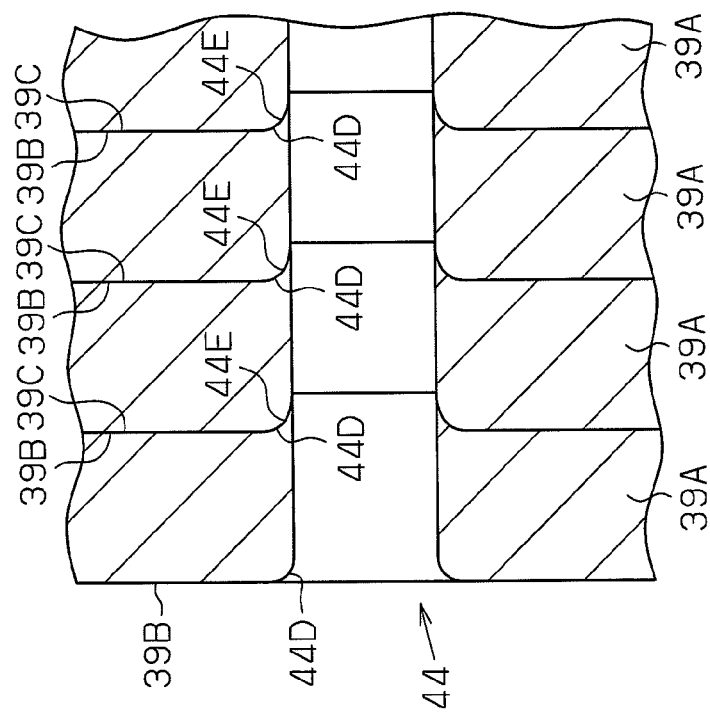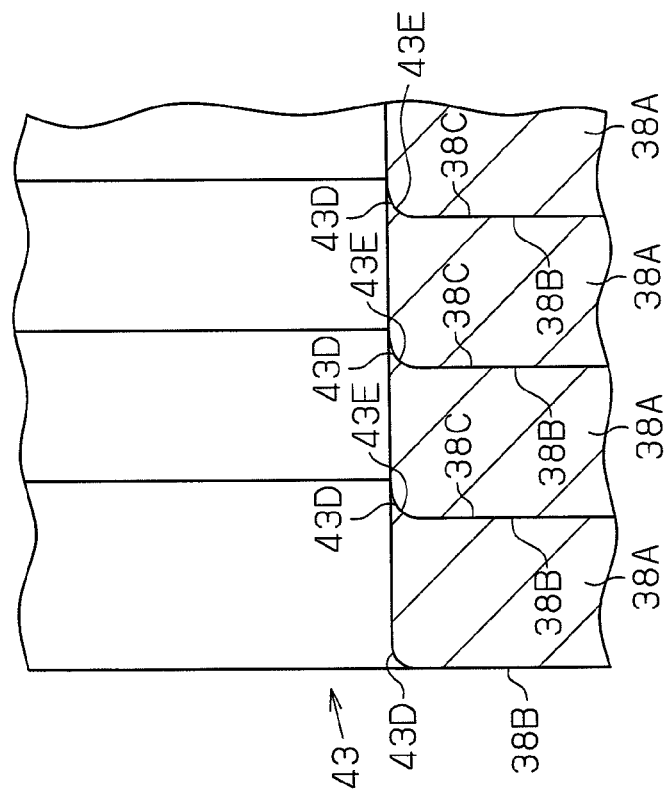

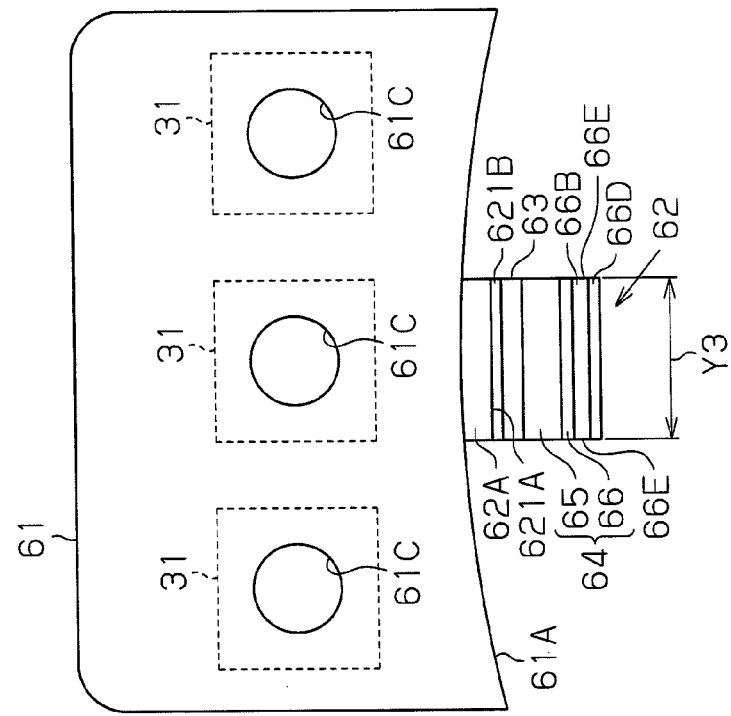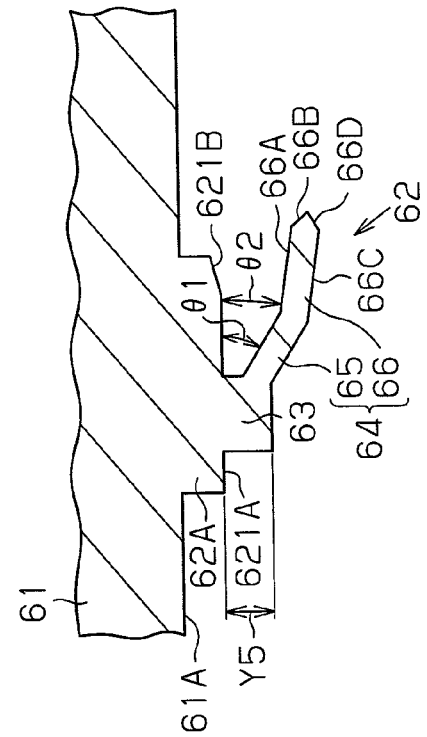

MOTOR-DRIVEN COMPRESSOR AND MOUNTING METHOD FOR MOTOR-DRIVEN COMPRESSOR

BACKGROUND OF THE INVENTION

The present invention relates to a motor-driven compressor and a mounting method for a motor-driven compressor.

A motor-driven compressor includes a compressing portion for compressing and discharging refrigerant, an electric motor for driving the compressing portion, and an inverter for actuating the electric motor. A conductive member through which the inverter and the electric motor are electrically connected together, and lead wires extending from the electric motor are electrically connected to each other through a connection terminal in a cluster block formed in a housing. The cluster block may be attached to the stator core of the electric motor, as disclosed in, for example, Japanese Laid-Open Patent Publication No. 2006-42409.

Specifically, an integral-motor-type compressor described in the aforementioned patent publication has a trapezoidal dovetail groove, which is formed in the outer peripheral surface of a stator core and extends in the axial direction of the stator core. A projection, which is engageable with the dovetail groove, is formed in a cluster housing of a cluster (cluster block). By sliding and inserting the projection into the dovetail groove, the projection is engaged with the dovetail groove. This attaches the cluster to the stator core.

However, in this compressor, the projection is slidable with respect to the dovetail groove and thus causes the cluster to be displaced from the stator core. In this case, there is a disadvantage that the cluster may detach from the stator core.

SUMMARY OF THE INVENTION

Accordingly, it is an objective of the present invention to provide a motor-driven compressor and a mounting method for a motor-driven compressor capable of preventing a cluster block from easily separating from a stator core.

To achieve the foregoing objective and in accordance with a first aspect of the present invention, a motor-driven compressor is provided that includes a housing, a compressing portion accommodated in the housing, an electric motor that is accommodated in the housing and serves as a drive source for the compressing portion, a drive circuit for actuating the electric motor, a conductive member through which the drive circuit and the electric motor are electrically connected to each other, a lead wire extending from the electric motor, a cluster block accommodated in the housing, a connection terminal that is arranged in the cluster block and electrically connects the conductive member and the lead wire to each other, a stator core and an insertion piece. The stator core is a component of the electric motor and has an outer peripheral surface. The stator core has an insertion hole that has an opening in the outer peripheral surface of the stator core and a cornered portion in the stator core. The insertion piece is formed with the cluster block and inserted into the insertion hole via the cornered portion. The cluster block is attached to the stator core by engaging the insertion piece with the insertion hole.

In accordance with a second aspect of the present invention, a method for mounting a stator core in a motor-driven compressor with a cluster block attached to the stator core is provided. The motor-driven compressor includes a housing, a compressing portion accommodated in the housing, an electric motor that is accommodated in the housing and serves as a drive source for the compressing portion, a drive circuit for actuating the electric motor, a conductive member through which the drive circuit and the electric motor are electrically connected to each other, a lead wire extended from the electric motor, a cluster block accommodated in the housing, a connection terminal that is arranged in the cluster block and electrically connects the conductive member and the lead wire to each other, a stator core, and an insertion piece. The stator core is a component of the electric motor and has an outer peripheral surface. The stator core has an insertion hole that has an opening in the outer peripheral surface of the stator core and a cornered portion in the stator core. The insertion piece is formed with the cluster block and inserted into the insertion hole via the bent portion. The cluster block being attached to the stator core through engagement between the insertion hole and the insertion piece. The motor-driven compressor further includes a rotor that is accommodated in the housing and is a component of the electric motor and a rotary shaft that is accommodated in the housing and rotates integrally with the rotor. The compressing portion, the electric motor, and the drive circuit are arranged sequentially in this order along the axial direction of the rotary shaft, the lead wire being extended from a side of the electric motor facing the compressing portion. The housing includes a motor housing member for accommodating the electric motor. The motor housing member has a tubular shape including an opening at one end. The motor housing member includes a space forming portion that defines a space for accommodating the cluster block in the motor housing member at a position between the space forming portion and the outer peripheral surface of the stator core. The method includes: heating the motor housing member to expand the whole motor housing radially outward; arranging the cluster block in the space by positioning the cluster block attached to the stator core at a position for inserting the cluster block into the space and then inserting the stator core into the motor housing member via the opening; and mounting the stator core in the motor housing member by decreasing the temperature of the motor housing member to contract the motor housing member radially inward and cause the motor housing member to contact the stator core in a pressed manner.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4A is an enlarged cross-sectional view showing curved portions and burrs formed in the second core plate;

FIG. 4B is an enlarged cross-sectional view showing curved portions and burrs formed in the third core plate;

FIG. 5A is a side cross-sectional view showing the insertion piece in a state before the insertion piece is inserted into the insertion hole;

FIG. 5B is a rear view showing a cluster block;

DETAILED DESCRIPTION OF THE PREFERRED EMBODIMENTS

First Embodiment

A motor-driven compressor according to a first embodiment of the present invention will now be described with reference to FIGS. 1 to 9.

Figure 1A:
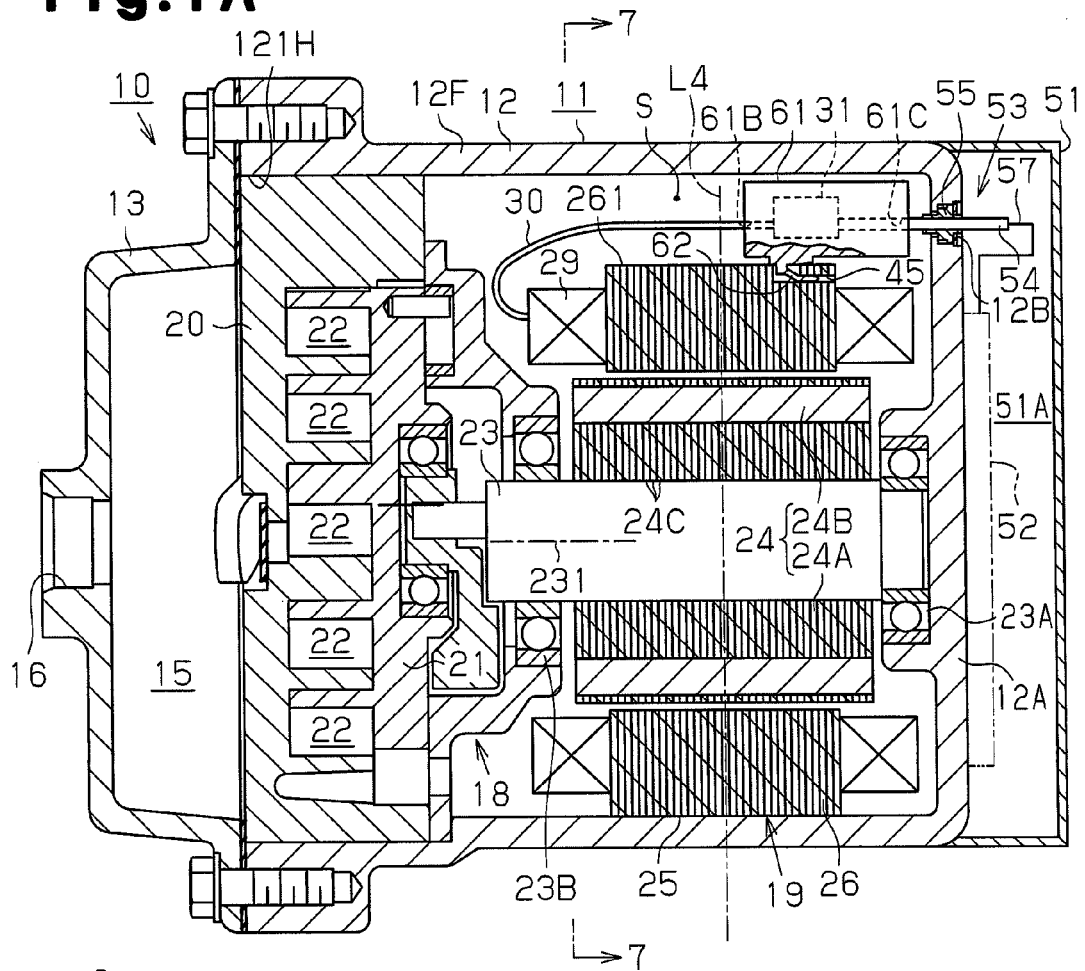
FIG. 1A is a side cross-sectional view showing a motor-driven compressor according to a first embodiment of the present invention.

As shown in FIG. 1A, a motor-driven compressor 10 has a housing 11 formed of metal. The housing 11 is configured by a tubular motor housing member 12 and a lid-shaped discharge housing member 13. The motor housing member 12 has an opening 121H at the left end, as viewed in the drawing, with the right end of the motor housing member 12 closed. The discharge housing member 13 is joined with the left end of the motor housing member 12. A discharge chamber 15 is defined between the motor housing member 12 and the discharge housing member 13. A discharge port 16 is formed in the left end wall of the discharge housing 13 and a non-illustrated external refrigerant circuit is connected to the discharge port 16. A non-illustrated intake port is formed in the peripheral wall of the motor housing member 12 and the external refrigerant circuit is connected to the intake port. The motor housing member 12 accommodates a compressing portion 18 for compressing refrigerant and an electric motor 19, which is a drive source for the compressing portion 18.

The electric motor 19 is arranged closer to an end wall 12A (as viewed to the right in FIG. 1A) of the motor housing member 12 than the compressing portion 18. Starting ends of lead wires (in the drawing, only one is shown) 30 of U, V, and W phases are extended from a coil end of a coil 29 of the electric motor 19, which is located at a position facing the compressing portion 18. A box-like cluster block 61 is arranged in the motor housing member 12. A connection terminal 31 is formed in the cluster block 61. The starting end of each of the lead wires 30 is connected to the connection terminal 31 through a first passing hole 61B formed in the cluster block 61.

The compressing portion 18 is configured by a stationary scroll 20, which is fixed in the motor housing member 12, and a movable scroll 21, which is arranged to face the stationary scroll 20. Compression chambers 22, each having a variable volume, are defined between the stationary scroll 20 and the movable scroll 21. The motor housing member 12 accommodates a rotary shaft 23. The rotary shaft 23 is rotationally supported by the motor housing member 12 through radial bearings 23A, 23B.

An inverter cover 51, which is formed of aluminum, is fixed to the end wall 12A of the motor housing member 12. An accommodation space 51A is defined between the end wall 12A and the inverter cover 51. In the accommodation space 51A, a inverter 52 (represented by the chain double-dashed lines in FIG. 1A) is fixed to the outer surface of the end wall 12A. The inverter 52 serves as a drive circuit. In the first embodiment, the compressing portion 18, the electric motor 19, and the inverter 52 are arranged sequentially in this order along an axial direction 231 of the rotary shaft 23.

A through hole 12B is formed in the end wall 12A of the motor housing member 12. A sealing terminal 53 is arranged in the through hole 12B. The sealing terminal 53 includes three metal terminals 54 and three insulation members 55 formed of glass. Each of the metal terminals 54 serves as a conductive member through which the electric motor 19 and the inverter 52 are electrically connected to each other. Each one of the insulation members 55 insulates and fixes the corresponding one of the metal terminals 54 with respect to the end wall 12A. FIG. 1A shows only one of the metal terminals 54 and the corresponding one of the insulation members 55. An end of each metal terminal 54 is electrically connected to the inverter 52 through a cable 57. The other end of the metal terminal 54 extends toward the interior of the motor housing member 12 and is inserted into the cluster block 61 via a second passing hole 61C of the cluster block 61 and thus electrically connected to the connection terminal 31.

The electric motor 19 will hereafter be described in detail.

A rotor 24 is fixed to the outer circumference of the rotary shaft 23 in such a manner as to rotate integrally with the rotary shaft 23. The rotor 24 has a cylindrical rotor core 24A. The rotor core 24A is secured to the circumference of the rotary shaft 23. A plurality of permanent magnets 24B are embedded in the rotor core 24A and spaced apart at equal pitches in a circumferential direction of the rotor core 24A. The rotor core 24A is formed by stacking a plurality of core plates 24C, each of which is formed by a magnetic body (an electromagnetic steel plate).

Figure 1B:
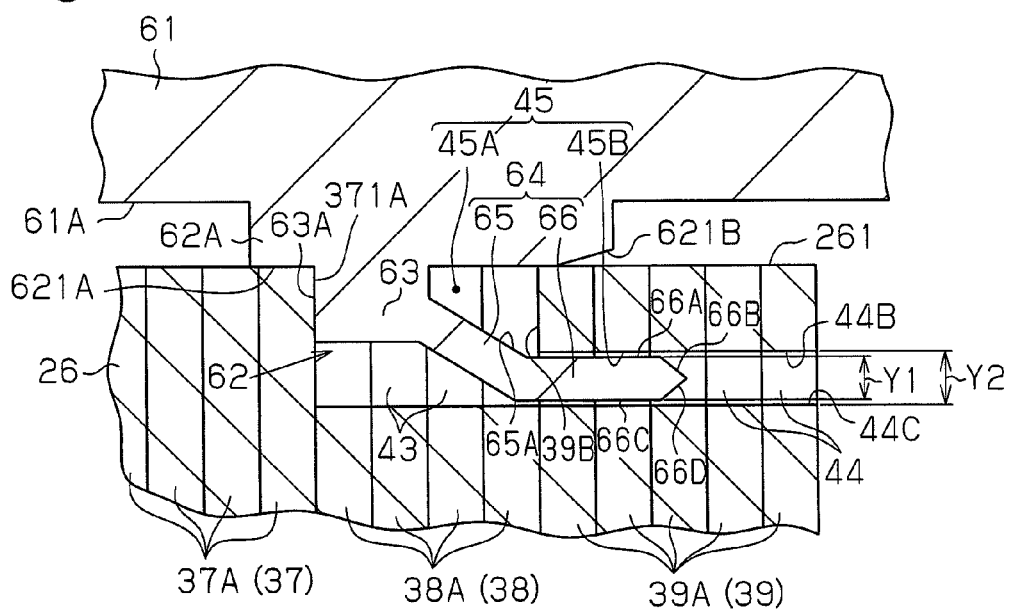
FIG. 1B is an enlarged side cross-sectional view showing an insertion piece inserted in an insertion hole.

A stator 25 is fixed to the inner peripheral surface of the motor housing member 12. The stator 25 has an annular stator core 26. With reference to FIG. 1B, the stator core 26 is configured by a first set of cores 37, a second set of cores 38, and a third set of cores 39. The first core set 37 is formed by a plurality of first core plates 37A, which are stacked. The second core set 38 is formed by a plurality of second core plates 38A, which are stacked. The third core set 39 is formed by a plurality of third core plates 39A, which are stacked. The first core set 37, the second core set 38, and the third core set 39 are arranged sequentially in this order from the side corresponding to the compressing portion 18 to the side corresponding to the inverter 52 along the axial direction of the stator core 26.

The first core plates 37A, the second core plates 38A, and the third core plates 39A are each formed by a magnetic body (an electromagnetic steel plate). A plurality of teeth 27 (see FIGS. 2 and 3) are arranged along the inner circumference of each of the first to third core plates 37A, 38A, 39A and spaced apart at equal pitches in a circumferential direction of the stator core 26. Slots 28 (see FIGS. 2 and 3), which receive the coil 29, are each formed between the corresponding adjacent pair of the teeth 27 and spaced apart at equal intervals in the circumferential direction of the stator core 26.

Figure 2:
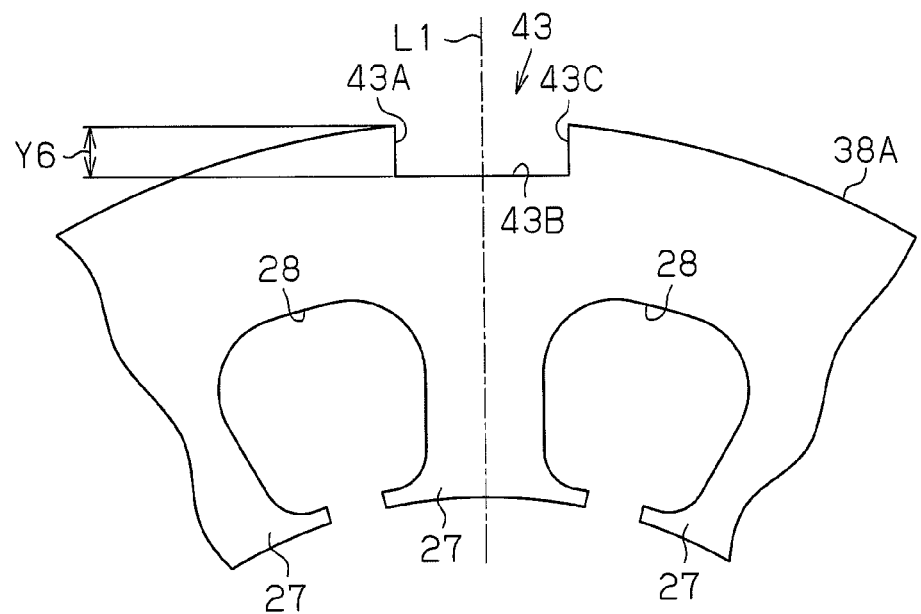
FIG. 2 is a plan view showing a portion of a second core plate.

As illustrated in FIG. 2, a first insertion space forming portion 43, which serves as an insertion hole forming portion, is formed in the outer peripheral surface of each of the second core plates 38A. Each of the first insertion space forming portions 43 is arranged at the position corresponding to the center line L1 in the width direction of the corresponding one of the teeth 27 in the circumferential direction of the associated second core plate 38A. Each first insertion space forming portion 43 is formed by a pair of flat side wall portions 43A, 43C, which are parallel to each other, and a flat bottom wall portion 43B, which extends perpendicular to the side wall portions 43A, 43C.

Figure 3:
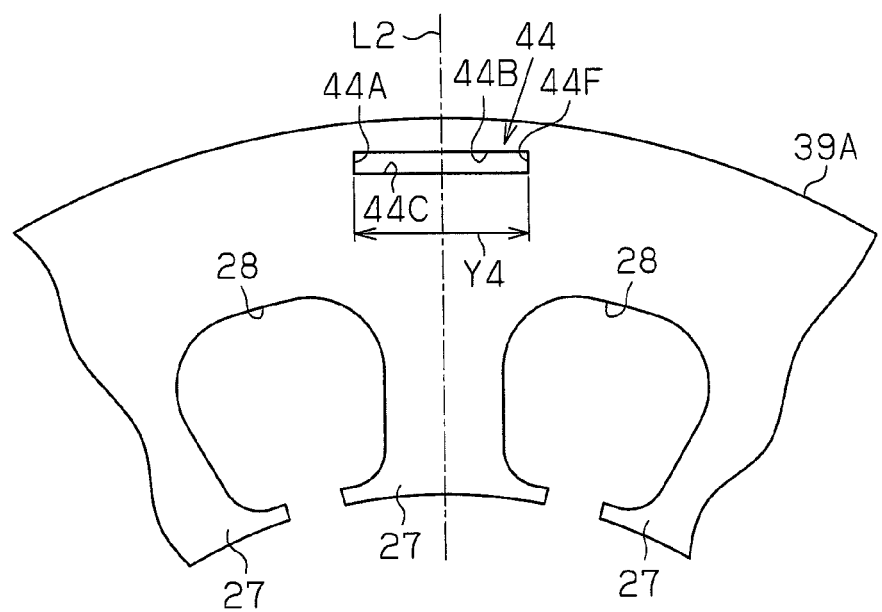
FIG. 3 is a plan view showing a portion of a third core plate.

With reference to FIG. 3, a second insertion space forming portion 44 serving as an insertion hole forming portion is formed in each of the third core plates 39A. Each of the second insertion space forming portions 44 is formed at the position corresponding to the center line L2 in the width direction of the corresponding one of the teeth 27 in the circumferential direction of the associated third core plate 39A. Each second insertion space forming portion 44 is formed by a pair of flat side wall portions 44A, 44F, which are parallel to each other, a flat top wall portion 44B, and a flat bottom wall portion 44C. The top wall portion 44B and the bottom wall portion 44C extend perpendicular to the side wall portions 44A, 44F. When the second core plates 38A and the third core plates 39A are stacked together, the bottom wall portions 44C of the second insertion space forming portions 44 are flush with the bottom wall portions 43B of the first insertion space forming portions 43. Further, the side wall portions 44A of the second insertion space forming portions 44 are flush with the side wall portions 43A of the first insertion space forming portions 43. Also, the side wall portions 44F of the second insertion space forming portions 44 are flush with the side wall portions 43C of the first insertion space forming portions 43.

As illustrated in FIG. 4A, each one of the first insertion space forming portions 43 is formed by punching out the associated one of the second core plates 38A from a first end surface 38B to a second end surface 38C. In the example illustrated in FIG. 4A, a portion of each second core plate 38A is punched out to form a curved portion 43D, which has an arcuate shape, in the end portion of the first insertion space forming portion 43 corresponding to the first end surface 38B of the second core plate 38A. In this manner, the wall of each first insertion space forming portion 43 is chamfered at the aforementioned end portion. Also in the example of FIG. 4A, a burr 43E is formed at the end portion of each first insertion space forming portion 43 corresponding to the second end surface 38C.

Referring to FIG. 4B, each one of the second insertion space forming portions 44 is formed by punching out the associated one of the third core plates 39A from a first end surface 39B to a second end surface 39C. In the example illustrated in FIG. 4B, a portion of each third core plate 39A is punched out to form a curved portion 44D, which is curved in an arcuate shape, in the end portion of the second insertion space forming portion 44 corresponding to the first end surface 39B of the third core plate 39A. In this manner, the wall of each second insertion space forming portion 44 is chamfered at the aforementioned end portion. Also in the example of FIG. 4B, a burr 44E is formed at the end portion of each second insertion space forming portion 44 corresponding to the second end surface 39C.

As illustrated in FIG. 1B, the first core plates 37A, the second core plates 38A, and the third core plates 39A are stacked together to form an insertion hole 45 at a position in the stator core 26 that is close to the inverter 52. Specifically, the position in the stator core 26 that is close to the inverter 52 is a position closer to the inverter 52 than the middle position of the stator core 26, which is the position in the stator core 26 corresponding to the chain single-dashed line L4 in FIG. 1A, in the axial direction of the stator core 26 (the axial direction 231 of the rotary shaft 23). In other words, the insertion hole 45 is formed at a position closer to the inverter 52 than the compressing portion 18 with respect to the middle position L4. The insertion hole 45 is arranged at such a position that, when the cluster block 61 is attached to the stator core 26 using the insertion hole 45 and the sealing terminal 53 is mounted with respect to the through hole 12B, the connection terminal 31 and the metal terminal 54 can be connected to each other.

The insertion hole 45 is configured by a first insertion space 45A and a second insertion space 45B. The first insertion space 45A is formed by joining the first insertion space forming portions 43 of the second core plates 38A together. The second insertion space 45B is formed by connecting the second insertion space forming portions 44 of the third core plates 39A together. The second insertion space 45B extends from the first insertion space 45A in a direction parallel to the axial direction 231 of the rotary shaft 23, which is a direction perpendicular to a radial direction of the stator core 26. The second insertion space 45B communicates with the first insertion space 45A, which has an opening in an outer peripheral surface 261 of the stator core 26. The first insertion space 45A and the second insertion space 45B thus form a cornered, or L-shaped, portion in the insertion hole 45. The cornered portion extends first in the radial direction of the stator core 26 and then extends in the axial direction of the stator core 26. With reference to FIG. 4A, in the second core plates 38A, the first end surfaces 38B face the corresponding second end surfaces 38C in the same directions as the direction in which the insertion hole 45 extends. Referring to FIG. 4B, in the third core plates 39A, the first end surfaces 39B face the corresponding second end surfaces 39C in the same directions as the extending direction of the insertion hole 45.

In the motor-driven compressor 10, which is configured as described above, electric power is controlled by the inverter 52 and then supplied to the electric motor 19 to rotate the rotary shaft 23 together with the rotor 24 at a controlled rotating speed and thus actuate the compressing portion 18. Through actuation of the compressing portion 18, refrigerant is drawn from the external refrigerant circuit into the motor housing member 12 via the intake port, compressed by the compressing portion 18 in the motor housing member 12, and then discharged into the external refrigerant circuit through the discharge port 16.

Next, the cluster block 61 will be described. In the description below, the left side of FIG. 1, which is the side corresponding to the first passing hole 61B, is defined as the front side of the cluster block 61. The right side of FIG. 1, or the side corresponding to the second passing hole 61C, is defined as the rear side of the cluster block 61.

As illustrated in FIG. 5B, an outer bottom surface 61A of the cluster block 61 has an arcuate shape extending along the outer peripheral surface 261 of the stator core 26 and extends parallel to the axial direction of the stator core 26. A base 62A is formed integrally with the outer bottom surface 61A of the cluster block 61 at the middle position of the outer bottom surface 61A in the extending direction of the arcuate shape. With reference to FIG. 5A, the base 62A has a rectangular block-like shape extending in the front-rear direction of the cluster block 61. A lower surface 621A of the base 62A extends parallel to the outer bottom surface 61A of the cluster block 61. An escape portion 621B, which is inclined to approach the outer bottom surface 61A of the cluster block 61 in the direction toward the rear end of the base 62A, is formed at a rear end portion of the lower surface 621A of the base 62A.

An insertion piece 62 is formed integrally with the lower surface 621A of the base 62A. The insertion piece 62 is configured by a rectangular stopper portion 63 projecting from the lower surface 621A of the base 62A and a plate-like inserting portion 64, which is formed continuously from the stopper portion 63.

The inserting portion 64 is configured by a first inserting portion 65 and a second inserting portion 66. The first inserting portion 65 extends continuously from the stopper portion 63 and the second inserting portion 66 extends continuously from the first inserting portion 65. The first inserting portion 65 extends linearly in such a manner as to separate from the lower surface 621A of the base 62A by inclination corresponding to the angle θ1 with respect to the lower surface 621A in the direction toward the distal end of the first inserting portion 65. The second inserting portion 66 extends linearly in such a manner as to separate from the lower surface 621A of the base 62A by inclination corresponding to the angle θ2 (θ1<θ2) with respect to the lower surface 621A in the direction toward the distal end of the second inserting portion 66. In other words, the inserting portion 64 extends in a direction separating from the outer bottom surface 61A of the cluster block 61. The inserting portion 64 is elastically deformable in a direction approaching or separating from the lower surface 621A of the base 62A. An angled joint portion between the first inserting portion 65 and the second inserting portion 66 allows the inserting portion 64 to easily deform.

A first tapered surface 66B, which is inclined in such a direction as to separate from the lower surface 621A of the base 62A, is formed in a distal end portion of the second inserting portion 66 on an upper surface 66A of the second inserting portion 66 facing the lower surface 621A of the base 62A. A second tapered surface 66D, which is inclined in such a manner as to approach the outer bottom surface 61A of the cluster block 61, is formed in the distal end portion of the second inserting portion 66 on a lower surface 66C of the second inserting portion 66, which is located at the opposite side to the lower surface 621A of the base 62A. In other words, the second inserting portion 66 has a tapered distal end portion. And the distal end portion of the second inserting portion 66 has a thickness in the radial direction of the stator core 26 and a first tapered surface 66B and second tapered surface 66D that decrease the thickness of the distal end portion toward the distal end of the second inserting portion 66. The crossing point between the first tapered surface 66B and the second tapered surface 66D is the distal end of the second inserting portion 66.

With reference to FIG. 1B, the thickness Y1 of the second inserting portion 66 is smaller than the distance Y2 between the top wall portion 44B and the bottom wall portion 44C of each second insertion space forming portion 44. The width Y3 of the second inserting portion 66 illustrated in FIG. 5B, which is the distance between two side surfaces of the second inserting portion 66, is slightly smaller than the distance Y4 between the two side wall portions 44A, 44F of each second insertion space forming portion 44 illustrated in FIG. 3. The second inserting portion 66 thus may be inserted into the second insertion space 45B in the insertion hole 45.

The length Y5 of the stopper portion 63 in its projecting direction illustrated in FIG. 5A is smaller than the length Y6 of the two side wall portions 43A, 43C of each first insertion space forming portion 43 in the extending direction illustrated in FIG. 2. The stopper portion 63 thus can be received in the first insertion space 45A in the insertion hole 45. When the second inserting portion 66 is received in the second insertion space 45B and the stopper portion 63 is arranged in the first insertion space 45A, the cluster block 61 is attached to the stator core 26.

A method for attaching the cluster block 61 to the stator core 26 will hereafter be described. The connection terminal 31 is arranged in advance in the cluster block 61, with the starting ends of the lead wires 30 connected to the connection terminal 31.

Figure 6:
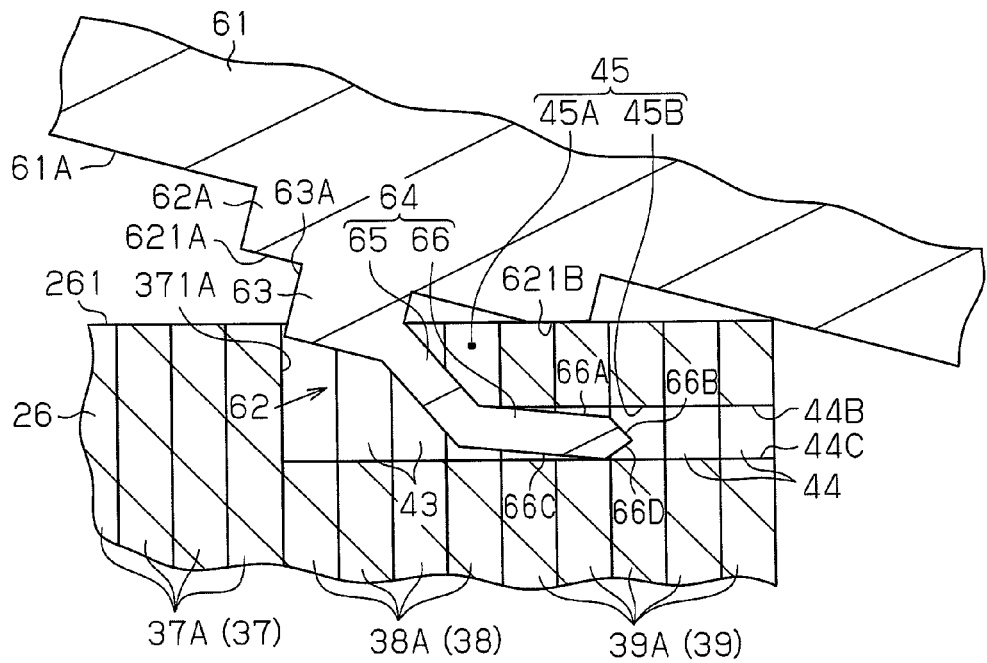
FIG. 6 is a side cross-sectional view showing the insertion piece in a state in which the insertion piece is being inserted into the insertion hole.

First, as illustrated in FIG. 6, the cluster block 61 is inclined as a whole to insert the inserting portion 64 of the insertion piece 62 into the insertion hole 45 in such a manner that the distal end portion of the second inserting portion 66 moves through the first insertion space 45A, or, in other words, passes through the cornered portion of the insertion hole 45, to be received in the second insertion space 45B. In this state, the escape portion 621B prevents contact between the rear end portion of the base 62A and the outer peripheral surface 261 of the stator core 26, which is brought about by inclining the cluster block 61, from hampering insertion of the inserting portion 64 into the insertion hole 45. In other words, the escape portion 621B facilitates insertion of the inserting portion 64 into the insertion hole 45. The distal end portion of the second inserting portion 66 has the first tapered surface 66B and the second tapered surface 66D. The curved portions 44D are formed at the corresponding ends of the associated second insertion space forming portions 44. This configuration prevents the distal end portion of the second inserting portion 66 from interfering with the ends of the second insertion space forming portions 44 facing the first insertion space 45A.

Then, the inserting portion 64 is elastically deformed to be forcibly inserted into the insertion hole 45 in such a manner that the distal end portion of the second inserting portion 66 is received in the second insertion space 45B. In this state, the inserting portion 64 is elastically deformed in such a manner as to bend the angled portion between the first inserting portion 65 and the second inserting portion 66 to a greater extent. Elastic deformation of the inserting portion 64 allows the second inserting portion 66 to be received in the second insertion space 45B, as illustrated in FIG. 1B. At this stage, the stopper portion 63 falls into the first insertion space 45A and is thus received in the first insertion space 45A. As a result, the cluster block 61 is attached to the stator core 26.

To detach the cluster block 61 from the stator core 26, the stopper portion 63 is drawn out of the first insertion space 45A and the second inserting portion 66 is retracted from the second insertion space 45B simultaneously. This removes the cluster block 61 from the stator core 26.

Figure 7:
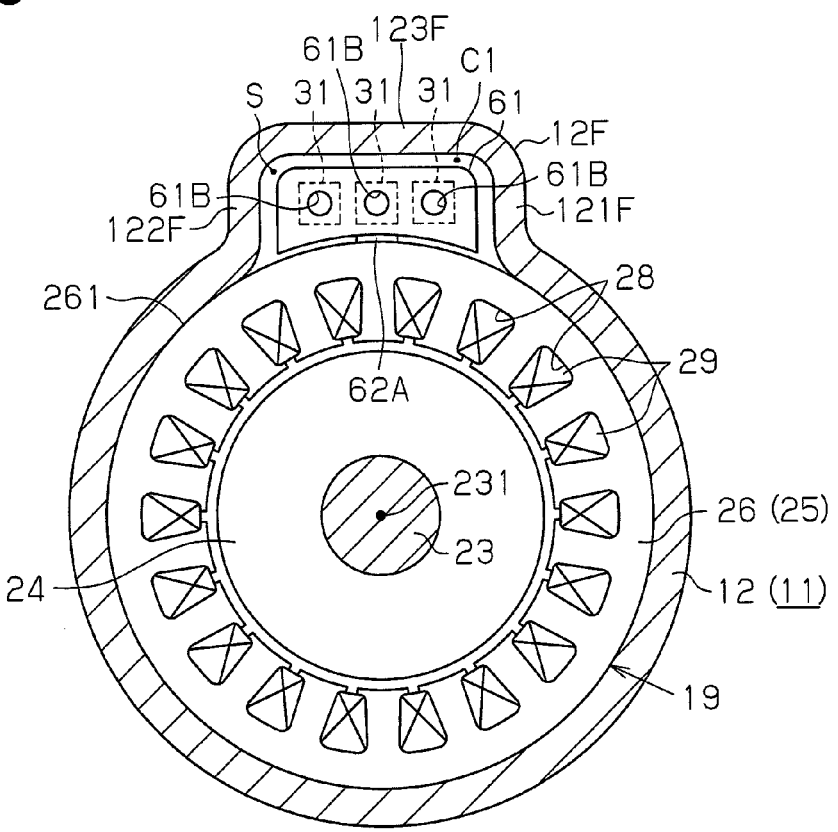
FIG. 7 is a cross-sectional view taken along line 7-7 of FIG. 1A.

As illustrated in FIG. 7, a space forming portion 12F, which projects radially outward, is formed in an upper section of the motor housing member 12, extending from the opening 121H of the motor housing member 12 toward the end wall 12A along the axial direction 231 of the rotary shaft 23. The space forming portion 12F is formed by a pair of first wall portions 121F, 122F, which extend in the radial direction of the stator core 26, and a second wall portion 123F, which connect the distal ends of the first wall portions 121F, 122F to each other. The inner surfaces of the two first wall portions 121F, 122F, the inner surface of the second wall portion 123F, and the outer peripheral surface 261 of the stator core 26 define a space S for accommodating the cluster block 61. When the cluster block 61 is accommodated in the space S, a clearance C1 is formed between the inner surfaces of the first wall portions 121F, 122F and the second wall portion 123F and the cluster block 61. In FIG. 7, the lead wires 30 are not illustrated.

A method for mounting the stator core 26, together with the cluster block 61 attached to the stator core 26, in the motor housing member 12 will hereafter be described. Although the lead wires 30 are connected in advance to the connection terminal 31, the lead wires 30 are not illustrated in FIG. 8.

Figure 8:
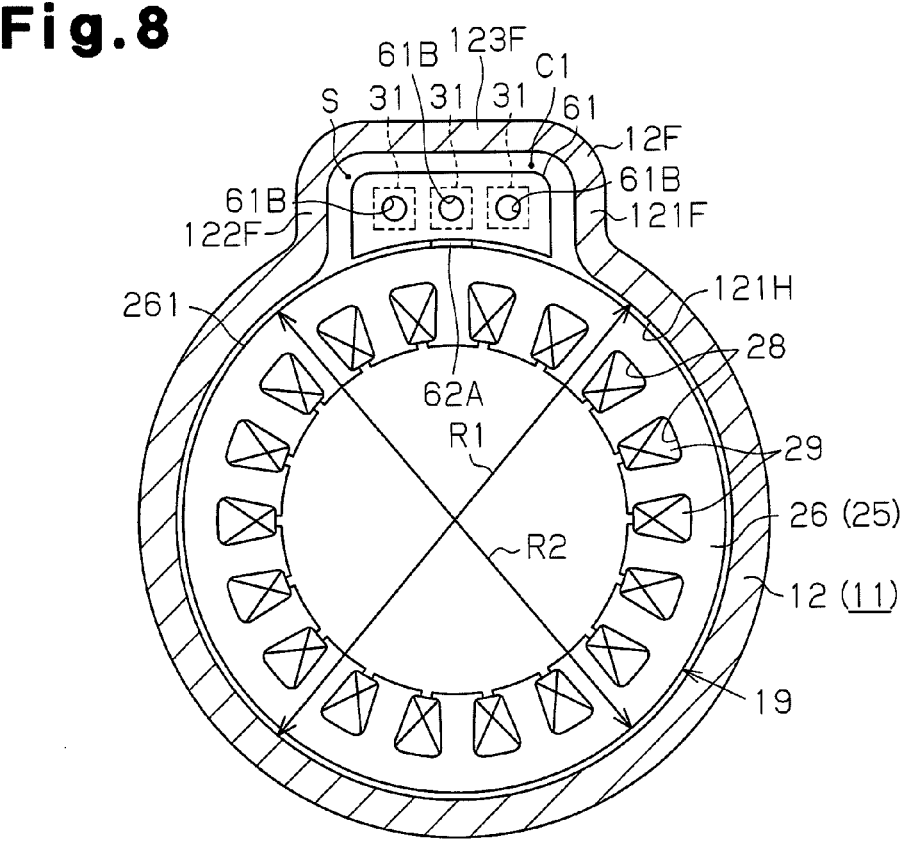
FIG. 8 is a longitudinal cross-sectional view showing a stator core to which the cluster block is attached in a state in which the stator core is inserted into a motor housing.
Figure 9:
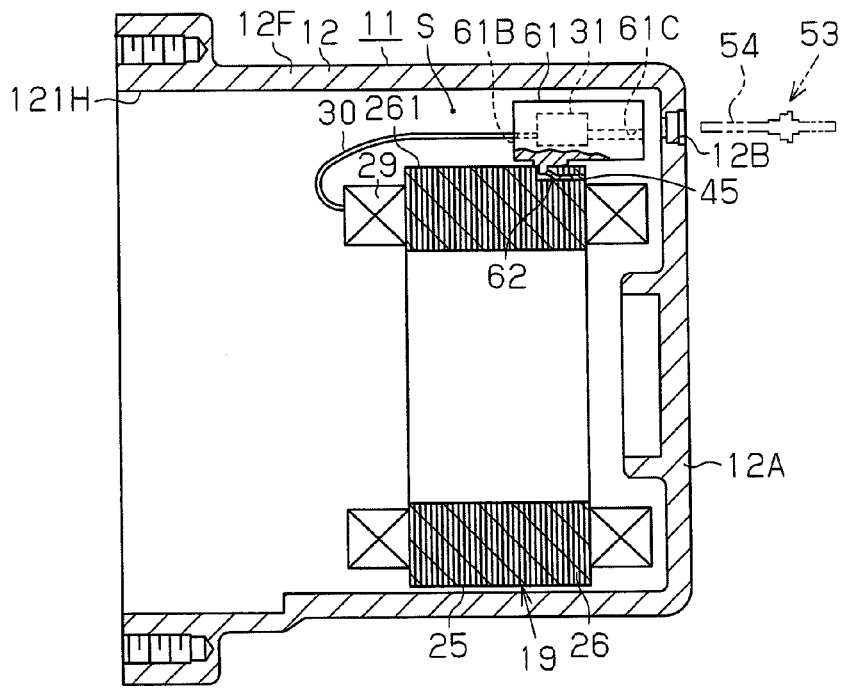
FIG. 9 is a side cross-sectional view showing the stator core to which the cluster block is attached in a state in which the stator core is inserted into the motor housing.

As illustrated in FIGS. 8 and 9, the motor housing member 12 is heated and expanded. Specifically, the motor housing member 12 as a whole is expanded radially outward, and the inner diameter R1 of the motor housing member 12 is increased compared to the inner diameter R1 before heating. The inner diameter R1 of the motor housing member 12 after heating is slightly greater than the outer diameter R2 of the stator core 26. The cluster block 61 is then positioned at a position from which the cluster block 61 is inserted into the space S. In this state, the stator core 26, together with the cluster block 61 attached to the stator core 26, is inserted into the motor housing member 12 through the opening 121H of the motor housing member 12. The cluster block 61 then passes through the space S to insert the stator core 26 into the motor housing member 12.

The stator core 26 is inserted into the motor housing member 12 until reaching a predetermined position. Then, with the cluster block 61 arranged at a predetermined position in the space S in the motor housing member 12, the motor housing member 12 is cooled. As the motor housing member 12 cools down, the motor housing member 12 contracts radially inward, thus causing the inner peripheral surface of the motor housing member 12 to press the outer peripheral surface 261 of the stator core 26. As a result, the stator core 26 is engaged with and mounted in the motor housing member 12.

Subsequently, with the stator core 26, to which the cluster block 61 is mounted, accommodated in the motor housing member 12, the sealing terminal 53 is arranged in the through hole 12B. This automatically connects the metal terminal 54 and the connection terminal 31 to each other. In other words, the predetermined position for the stator core 26 in the motor housing member 12 and the predetermined position for the cluster block 61 in the space S refer to such positions that allow automatic connection between the metal terminal 54 and the connection terminal 31 when the sealing terminal 53 is mounted in the through hole 12B with the stator core 26 received in the motor housing member 12.

Operation of the first embodiment will hereafter be described.

When the cluster block 61 is attached to the stator core 26, an end surface 63A of the stopper portion 63 faces a first end surface portion 371A of the corresponding first core plate 37A. As a result, the first end surface portion 371A of the first core plate 37A receives load acting on the cluster block 61 at the time when the sealing terminal 53 is mounted in the through hole 12B to connect the metal terminal 54 to the connection terminal 31. This prevents the cluster block 61 from moving toward the compressing portion 18 with respect to the stator core 26. In the first embodiment, the first end surface portion 371A of the first core plate 37A functions as a receiving portion that receives the load acting on the cluster block 61 at the time when the metal terminal 54 is connected to the connection terminal 31.

In the state in which the cluster block 61 is attached to the stator core 26, upward movement of the cluster block 61 is restricted through contact between the upper surface 66A of the second inserting portion 66 and the top wall portions 44B of the second insertion space forming portions 44 (a top wall surface configuring the second insertion space 45B). Downward movement of the cluster block 61 is restricted through contact between the lower surface 66C of the second inserting portion 66 and the bottom wall portions 44C of the second insertion space forming portions 44 (a lower wall surface configuring the second insertion space 45B). Lateral movement of the cluster block 61 is restricted through contact between two side surfaces 66E of the second inserting portion 66 and the two side wall portions 44A, 44F of each second insertion space forming portion 44 (side wall surfaces configuring the second insertion space 45B). Movement of the cluster block 61 toward the inverter 52 is restricted through contact between a portion of the upper surface 65A of the first inserting portion 65 at the side corresponding to the inverter 52 and the first end surface 39B of the corresponding third core plate 39A (a portion of a wall surface configuring the first insertion space 45A).

When the second inserting portion 66 is received in the second insertion space 45B, the lower surface 621A of the base 62A is held in contact with the outer peripheral surface 261 of the stator core 26. This effectively maintains the attachment posture of the cluster block 61 with respect to the stator core 26. The position of the connection terminal 31 relative to the position of the metal terminal 54 is thus maintained suitable for connection of the metal terminal 54 to the connection terminal 31. This ensures smooth connection between the metal terminal 54 and the connection terminal 31. Accordingly, in the first embodiment, the lower surface 621A of the base 62A functions as a maintaining portion that maintains the posture of the cluster block 61.

The first embodiment has the advantages described below.
(1) The upper surface 66A of the second inserting portion 66 contacts the top wall portions 44B of the second insertion space forming portions 44 to restrict upward movement of the cluster block 61. The lower surface 66C of the second inserting portion 66 contacts the bottom wall portions 44C of the second insertion space forming portions 44 to restrict downward movement of the cluster block 61. The two side surfaces 66E of the second inserting portion 66 contact the side wall portions 44A of the second insertion space forming portions 44 to restrict lateral movement of the cluster block 61. The portion of the upper surface 65A of the first inserting portion 65 at the side corresponding to the inverter 52 contacts the first end surface 39B of the corresponding third core plate 39A to restrict movement of the cluster block 61 toward the inverter 52. The end surface 63A of the stopper portion 63 facing the corresponding first core plate 37A contacts the first end surface portion 371A of the first core plate 37A to restrict movement of the cluster block 61 toward the compressing portion 18. This prevents the second inserting portion 66, which is received in the second insertion space 45B via the first insertion space 45A, from separating from the second insertion space 45B. The cluster block 61 is thus stopped from moving relative to the stator core 26. As a result, the cluster block 61 is prevented from easily detaching from the stator core 26.

(2) The insertion piece 62 is elastic. The insertion piece 62 is thus elastically deformed when inserted into the insertion hole 45. This facilitates insertion of the insertion piece 62 into the insertion hole 45.

(3) The insertion piece 62 has the stopper portion 63, which is arranged in the first insertion space 45A communicating with the second insertion space 45B, and the inserting portion 64 extending continuously from the stopper portion 63. The inserting portion 64 is configured by the first inserting portion 65, which extends continuously from the stopper portion 63, and the second inserting portion 66, extending continuously from the first inserting portion 65. The first inserting portion 65 extends in such a manner as to separate from the lower surface 621A of the base 62A in an inclining manner toward the distal end of the first inserting portion 65. The second inserting portion 66 extends in such a manner as to separate from the lower surface 621A of the base 62A in an inclining manner toward the distal end of the second inserting portion 66. This facilitates elastic deformation of the inserting portion 64, compared to a case in which the first inserting portion 65 and the second inserting portion 66 extend parallel to the lower surface 621A of the base 62A. As a result, when the inserting portion 64 is inserted into the insertion hole 45, the inserting portion 64 is elastically deformed and thus flexes greatly. The stopper portion 63 thus falls into and is received by the first insertion space 45A. This facilitates arrangement of the stopper portion 63 in the first insertion space 45A.

(4) The end surface 63A of the stopper portion 63 and the first end surface portion 371A of the corresponding first core plate 37A contact with each other. The first end surface portion 371A of the first core plate 37A receives the load acting on the cluster block 61 at the time when the metal terminal 54 is connected to the connection terminal 31. This prevents the load on the cluster block 61 from moving the cluster block 61 toward the compressing portion 18 with respect to the stator core 26 when the metal terminal 54 is connected to the connection terminal 31.

(5) The first tapered surface 66B and the second tapered surface 66D are formed on the distal end portion of the second inserting portion 66. In other words, the distal end portion of the second inserting portion 66 is tapered in such a manner that, when the second inserting portion 66 is inserted into the second insertion space 45B, the distal end portion separates from the peripheral walls of the inlet of the second insertion space 45B. This allows smooth insertion of the second inserting portion 66 into the second insertion space 45B compared to a case without a first tapered surface 66B or a second tapered surface 66D on the distal end portion of the second inserting portion 66.

(6) When the second inserting portion 66 is received in the second insertion space 45B, the lower surface 621A of the base 62A is held in contact with the outer peripheral surface 261 of the stator core 26. This effectively maintains the attachment posture of the cluster block 61 with respect to the stator core 26. As a result, the position of the connection terminal 31 relative to the position of the metal terminal 54 is maintained suitable for connection between the metal terminal 54 and the connection terminal 31. The metal terminal 54 is thus smoothly connected to the connection terminal 31.

(7) Each one of the first and second insertion space forming portions 43, 44 is formed at the position corresponding to the center line L1, L2 of the corresponding one of the teeth 27 in the width direction as viewed in the circumferential direction of the associated second or third core plate 38A, 39A. In other words, the insertion hole 45 is arranged at the position in the stator core 26 at which the magnetic field produced by the teeth 27 (the stator core 26) is divided into two streams at the side corresponding to the outer circumference of the stator core 26 and thus the magnetic flux does not easily become saturated, or the position at which magnetic flux density is small. As a result, interference with the flow of a magnetic flux is minimized.

(8) In the motor-driven compressor 10 of the first embodiment, the compressing portion 18, the electric motor 19, and the inverter 52 are arranged sequentially in this order along the axial direction 231 of the rotary shaft 23. The lead wires 30 of the electric motor 19 are extended from the coil end facing the compressing portion 18. This makes it unnecessary to electrically wire the electric motor 19 to the inverter 52 in the narrow space between the electric motor 19 and the inverter 52, which is, in the example illustrated in FIG. 1, the space between the rear end surface of the stator core 26 and the end wall 12A of the motor housing member 12. In other words, in the motor-driven compressor 10 in which the compressing portion 18, the electric motor 19, and the inverter 52 are arranged in series in this order, only simple connection of the metal terminal 54 to the connection terminal 31 in the cluster block 61 is necessary. This improves work efficiency in assembling the motor-driven compressor 10. The metal terminal 54 and the connection terminal 31 are electrically connected together by arranging the sealing terminal 53 in the through hole 12B with the cluster block 61 attached to the stator core 26. As a result, mounting of the sealing terminal 53 in the through hole 12B and connection between the metal terminal 54 and the connection terminal 31 are accomplished simultaneously.

(9) The insertion hole 45 is formed at the position on the outer peripheral surface 261 of the stator core 26 close to the inverter 52. When the insertion piece 62 is received in the insertion hole 45, the position of the metal terminal 54 reaches the position of the connection terminal 31. Accordingly, in various types of motor-driven compressors having different axial lengths of the stator core 26, connection between the metal terminal 54 and the connection terminal 31 is smoothly performed regardless of the different axial lengths of the stator core 26, as long as the distance between the end surface of the stator core 26 at the side corresponding to the inverter 52 to the insertion hole 45 is constant and the length of the metal terminal 54 is constant. Further, compared to a case in which the insertion hole 45 is formed at a position on the outer peripheral surface 261 of the stator core 26 close to the compressing portion 18, the attachment position of the cluster block 61 with respect to the stator core 26 becomes closer to the inverter 52. The length of the metal terminal 54 is thus decreased.

(10) In the second core plates 38A, the first end surfaces 38B face the corresponding second end surfaces 38C in the same directions as the extending direction of the insertion hole 45. Likewise, in the third core plates 39A, the first end surfaces 39B face the corresponding second end surfaces 39C in the same directions as the extending direction of the insertion hole 45. The first insertion space forming portions 43 and the second insertion space forming portions 44, which are punched out, may have the burrs 43E, 44E at the second end surfaces 38C, 39C of the second core plates 38A and the third core plates 39A. When the burrs 43E, 44E are formed, the burrs 43E, 44E are faced in the extending direction of the insertion hole 45 and thus do not hamper insertion of the inserting portion 64 into the insertion hole 45. The inserting portion 64 is thus smoothly received by the insertion hole 45. Specifically, the curved portions 44D are formed at the corresponding ends of the second insertion space forming portions 44. This prevents the distal end portion of the second inserting portion 66 from interfering with the ends of the second insertion space forming portions 44 facing the first insertion space 45A. As a result, the inserting portion 64 is smoothly inserted into the insertion hole 45.

(11) The escape portion 621B, which is inclined in such a manner as to approach the outer bottom surface 61A of the cluster block 61 toward the rear end of the base 62A, is formed at the rear end of the lower surface 621A of the base 62A. As a result, when the cluster block 61 as a whole is inclined to insert the inserting portion 64 of the insertion piece 62 into the insertion hole 45, the escape portion 621B prevents contact between the rear end of the base 62A and the outer peripheral surface 261 of the stator core 26, which is brought about by inclining the cluster block 61, from hampering insertion of the inserting portion 64 into the insertion hole 45.

(12) To detach the cluster block 61 from the stator core 26, the stopper portion 63 is drawn out from the first insertion space 45A and the second inserting portion 66 is removed from the second insertion space 45B simultaneously. The cluster block 61 is thus separated from the stator core 26. As a result, the cluster block 61 and the stator core 26 are detached from each other and discarded separately, thus ensuring efficient recycling.

(13) In the motor housing member 12, the space S for accommodating the cluster block 61 is formed by the space forming portion 12F, which extends from the opening 121H of the motor housing member 12 to the end wall 12A to define the space S between the space forming portion 12F and the outer peripheral surface 261 of the stator core 26. After the motor housing member 12 is heated and expanded, the cluster block 61 is positioned with respect to the space S and, in this state, the stator core 26, together with the cluster block 61 attached to the stator core 26, is inserted into the motor housing member 12 via the opening 121H. At this stage, the cluster block 61 moves through the space S, thus ensuring easy insertion of the stator core 26, to which the cluster block 61 is attached, into the motor housing member 12. Then, as the motor housing member 12 cools down, the stator core 26 is engaged with and mounted in the motor housing member 12. Subsequently, with the stator core 26, to which the cluster block 61 is attached, mounted in the motor housing member 12, the sealing terminal 53 is arranged in the through hole 12B to automatically connect the metal terminal 54 to the connection terminal 31. Also, since attachment of the cluster block 61 to the outer peripheral surface 261 of the stator core 26 after insertion of the stator core 26 into the motor housing member 12 becomes unnecessary, work efficiency for mounting the cluster block 61 is improved.

(14) The cornered portion of the insertion hole 45 extends first in the radial direction of the stator core 26 and then extends in the axial direction of the stator core 26. This makes it easy to restrict movement of the cluster block 61 relative to the stator core 26 along a direction perpendicular to the axial direction of the stator core 26.

Second Embodiment

A motor-driven compressor according to a second embodiment of the present invention will now be described with reference to FIG. 10. Same or like reference numerals are given to components of the second embodiment that are the same as or like corresponding components of the first embodiment. Repeated description of these components is omitted or simplified for the second embodiment.

Figure 10:
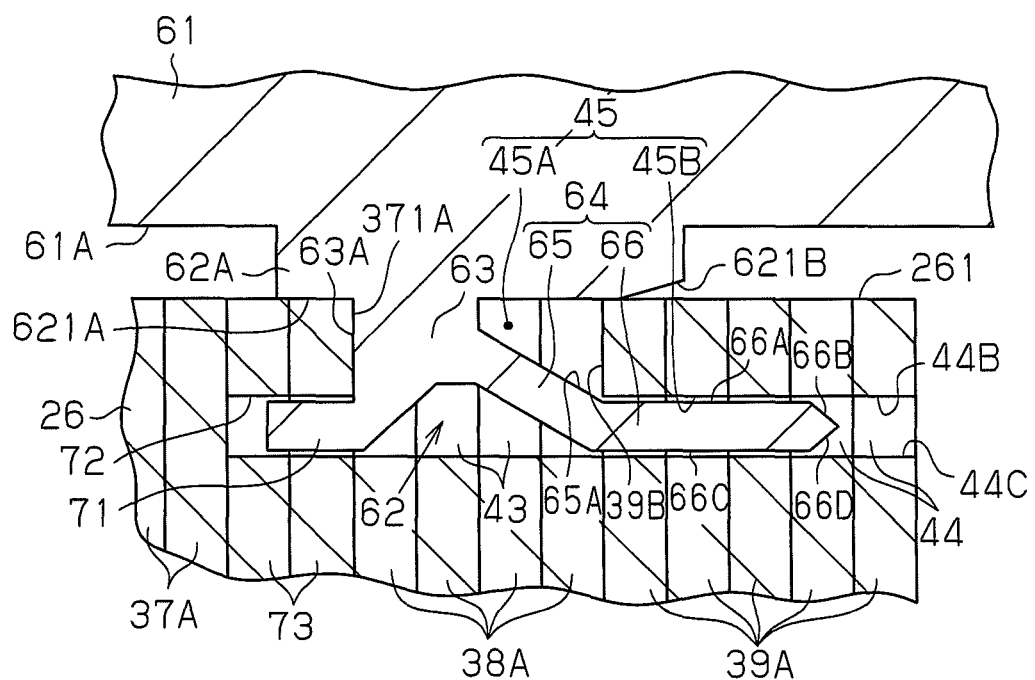
FIG. 10 is an enlarged side cross-sectional view showing an insertion piece inserted into an insertion hole according to a second embodiment of the invention.

As illustrated in FIG. 10, the insertion piece 62 has an engagement projection 71. The engagement projection 71 is formed continuously from the stopper portion 63 and projected in the opposite direction to the inserting portion 64. The stator core 26 has an engagement recess 72, with which the engagement projection 71 is engageable. The engagement recess 72 is formed by punching a plurality of fourth core plates 73, which are stacked together between the first core plates 37A and the second core plates 38A. The engagement recess 72 communicates with the first insertion space 45A.

To send the insertion piece 62 into the insertion hole 45, the inserting portion 64 is inserted into the second insertion space 45B. Then, the inserting portion 64 is forcibly pressed further into the second insertion space 45B until the engagement projection 71 reaches such a state that the engagement projection 71 can proceed into the first insertion space 45A. At this stage, the engagement projection 71 is inserted into the first insertion space 45A. Subsequently, the inserting portion 64 is released from pressing into the second insertion space 45B, thus causing the engagement projection 71 to be received in the engagement recess 72. The engagement projection 71 further enhances the effect of preventing the cluster block 61 from separating from the stator core 26, compared to a case without an engagement projection 71 in the insertion piece 62.

To detach the cluster block 61 from the stator core 26, the inserting portion 64 is forcibly pressed further into the second insertion space 45B to disengage the engagement projection 71 from the engagement recess 72. The engagement projection 71 is then removed from the first insertion space 45A. Subsequently, by removing the inserting portion 64 from the second insertion space 45B, the cluster block 61 is separated from the stator core 26.

Accordingly, the second embodiment has the advantage described below in addition to advantages similar to the advantages (1) to (14) of the first embodiment.

(15) The insertion piece 62 has the engagement projection 71 and the stator core 26 has the engagement recess 72, with which the engagement projection 71 is engageable. Engagement between the engagement projection 71 and the engagement recess 72 further improves the effect of preventing detachment of the cluster block 61 from the stator core 26.

The illustrated embodiment may be modified to the forms described below.

Figure 11:
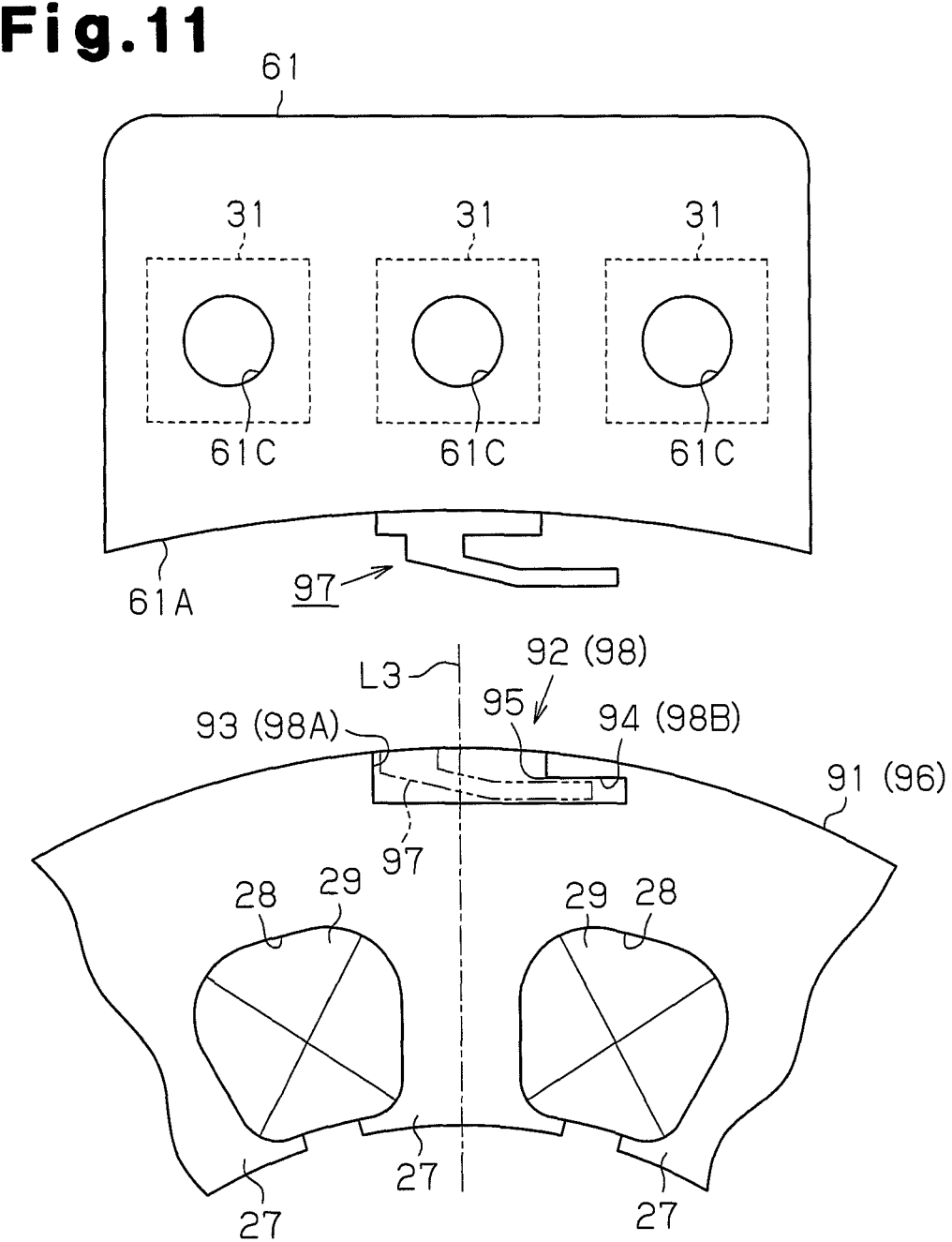
FIG. 11 is a view showing a portion of a core plate and a cluster block according to another embodiment of the invention.

In the illustrated embodiments, the insertion hole 45 extends in the axial direction of the stator core 26. However, the insertion hole 45 may be formed to extend in a direction perpendicular to the axial direction of the stator core 26. For example, as illustrated in FIG. 11, in a fifth core plate 91, an insertion hole forming portion 92 for forming an insertion hole is formed at a position corresponding to the center line L3 of the corresponding one of the teeth 27 in the width direction as viewed in a circumferential direction of the fifth core plate 91. The insertion hole forming portion 92 is configured by a first insertion space forming portion 93 and a second insertion space forming portion 94. The second insertion space forming portion 94 communicates with the first insertion space forming portion 93 and extends in a direction perpendicular to the axial direction of the stator core 96 and a direction perpendicular to a radial direction of the fifth core plate 91. A plurality of fifth core plates 91 are then stacked together and a plurality of fifth core plates 37A are arranged at both sides of the stacked fifth core plates 91. In this manner, a stator core 96 is formed. The stator core 96 thus has an insertion hole 98, which extends in a direction perpendicular to the axial direction of the stator core 96 and a direction perpendicular to the radial direction of the stator core 96. The insertion hole 98 is configured by a first insertion space 98A and a second insertion space 98B. The first insertion space 98A has an opening in the outer peripheral surface of the stator core 96. The second insertion space 98B extends from the first insertion space 98A in a direction perpendicular to the radial direction and the axial direction of the stator core 96. As a result, the first insertion space 98A and the second insertion space 98B form a cornered, or L-shaped, portion in the insertion hole 98. The cornered portion extends first in the radial direction of the stator core 96 and then extends in a direction perpendicular to the axial direction of the stator core 96.

In this embodiment, the stator core 96 is configured by two types of core plates, which are the first core plates 37A and the fifth core plates 91.

An insertion piece 97, which extends in a direction perpendicular to the front-rear direction of the cluster block 61, is inserted into the insertion hole 98. Then, when the metal terminal 54 is connected to the connection terminal 31 with the cluster block 61 attached to the stator core 96, a side surface of the insertion piece 97 contacts an end surface of the corresponding first core plate 37A. The first core plate 37A thus receives load acting on the cluster block 61 at the time when the metal terminal 54 and the connection terminal 31 are connected to each other. As a result, connection between the metal terminal 54 and the connection terminal 31 is accomplished without moving the cluster block 61 toward the compressing portion 18 with respect to the stator core 96.

The cornered portion of the insertion hole extends first in the radial direction of the stator core 96 and then extends in a direction perpendicular to the axial direction of the stator core 96. This makes it easy to restrict movement of the cluster block 61 relative to the stator core 96 along the axial direction of the stator core 96.

Additionally, an arcuate curved surface may be formed by chamfering walls of a stepped portion 95 between the first insertion space forming portion 93 and the second insertion space forming portion 94. In this manner, the distal end of the insertion piece 97 is smoothly inserted without interference from the stepped portion 95.

Figure 12A:
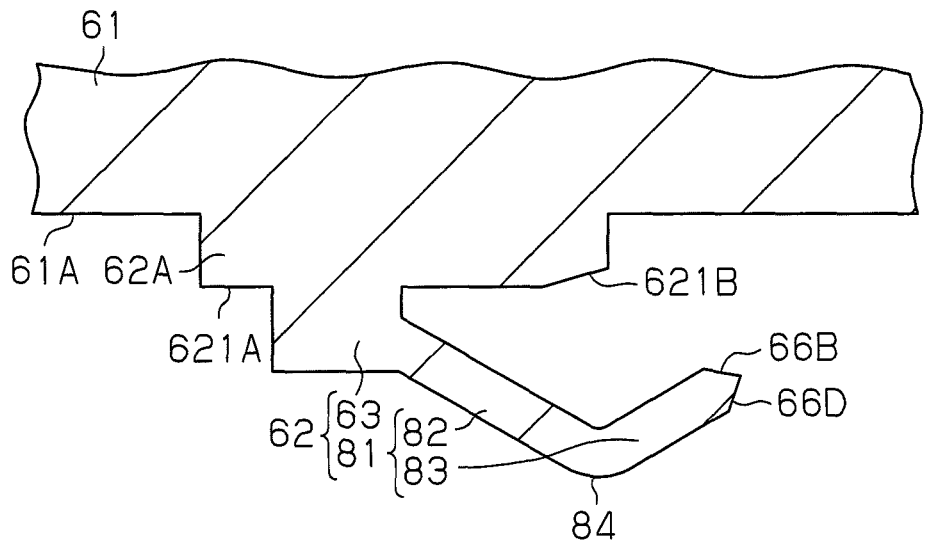
FIG. 12A is an enlarged side cross-sectional view showing an insertion piece in a state before the insertion piece is inserted into an insertion hole according to another embodiment of the invention.

In the illustrated embodiments, the inserting portion 64 extends in a manner inclining in a direction separating from the lower surface 621A of the base 62A. However, as illustrated in FIG. 12A, for example, an inserting portion 81 may include a third inserting portion 82 and a fourth inserting portion 83. The third inserting portion 82 is formed continuously from the stopper portion 63 and extends linearly in a manner inclining in a direction separating from the lower surface 621A of the base 62A toward the distal end of the third inserting portion 82. The fourth inserting portion 83 is formed continuously from the third inserting portion 82 and extends linearly in a manner inclining in a direction approaching the lower surface 621A of the base 62A toward the distal end of the fourth inserting portion 83. The inserting portion 81 is curved in an arcuate shape.

Figure 12B:
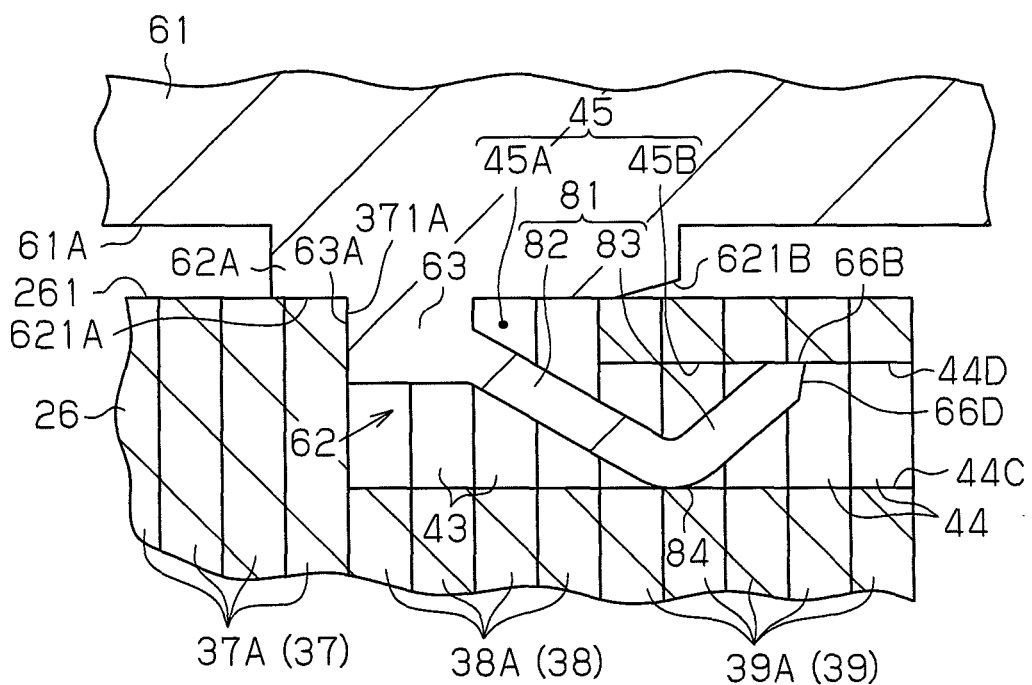
FIG. 12B is an enlarged side cross-sectional view showing an insertion piece inserted into an insertion hole.

When the inserting portion 81 is inserted into the second insertion space 45B, as illustrated in FIG. 12B, a curved portion 84 between the third inserting portion 82 and the fourth inserting portion 83 contacts the bottom wall portion 44C and the distal end portion of the fourth inserting portion 83 contacts the top wall portion 44B. The cluster block 61 is thus attached to the stator core 26 in a maintained posture without becoming unstable with respect to the stator core 26.

Figure 13:
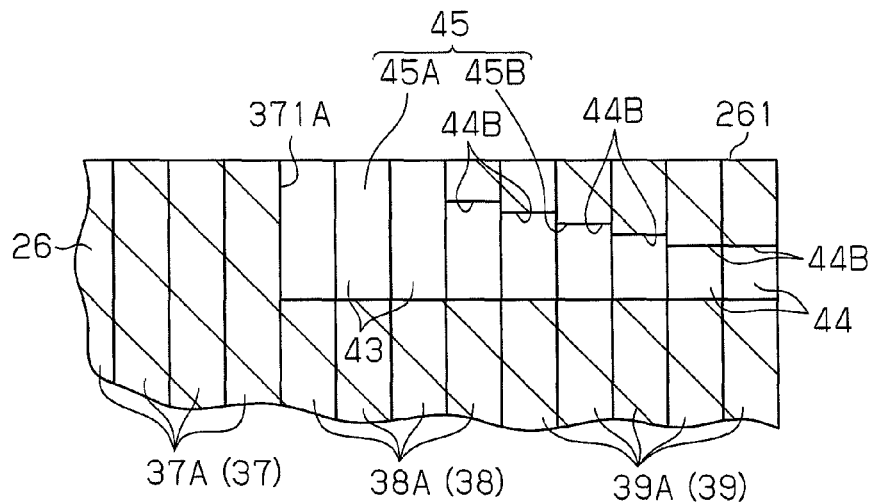
FIG. 13 is a side cross-sectional view showing an insertion hole according to another embodiment of the invention.

In the embodiment illustrated in FIG. 13, the insertion hole 45 has a stepped end. Specifically, the second insertion space 45B has a stepped upper wall portion. Specifically, the distances between the top wall portions 44B of the second insertion space forming portions 44 in the third core plates 39A and the outer peripheral surface 261 of the stator core 26 become smaller toward the first insertion space 45A. This configuration prevents the distal end of the second inserting portion 66 from interference by the end of the second insertion space 45B facing the first insertion space 45A. The second inserting portion 66 is thus smoothly inserted into the second insertion space 45B.

In the illustrated embodiments, the first insertion space 45A and the second insertion space 45B may each be formed at a position other than the position corresponding to the center line L1, L2 of the associated one of the teeth 27 in the circumferential direction of the second or third core plate 38A, 39A.

In the illustrated embodiments, the compressing portion 18, the electric motor 19, and the inverter 52 do not necessarily have to be arranged sequentially in this order along the axial direction 231 of the rotary shaft 23. For example, the inverter cover 51 may be fixed to a peripheral wall of the motor housing member 12 with the inverter 52 accommodated in the accommodation space defined by the peripheral wall of the motor housing member 12 and the inverter cover 51.

In the illustrated embodiments, the first tapered surface 66B may be omitted from the distal end portion of the second inserting portion 66. Also, the second tapered surface 66D may be omitted from the distal end portion of the second inserting portion 66.

Figure 14:
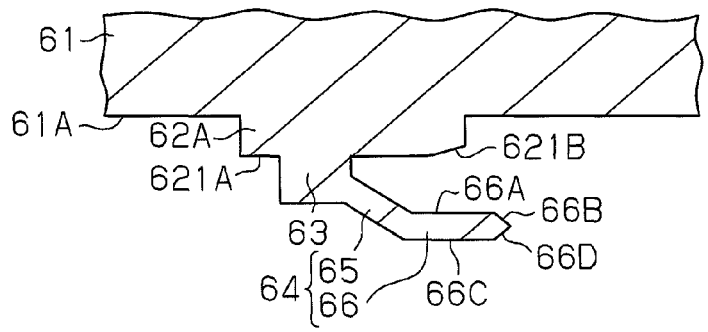
FIG. 14 is a side cross-sectional view showing an insertion piece in a state before the insertion piece is inserted into an insertion hole according to another embodiment of the invention.

As in the embodiment illustrated in FIG. 14, the second inserting portion 66 may extend parallel to the lower surface 621A of the base 62A when the inserting portion 64 is not received in the insertion hole 45.

In the illustrated embodiments, when the second inserting portion 66 is received in the second insertion space 45B, the lower surface 621A of the base 62A may be spaced from the outer peripheral surface 261 of the stator core 26. That is, there may a clearance between the lower surface 621A of the base 62A and the outer peripheral surface 261 of the stator core 26.

In the illustrated embodiments, the base 62A may be omitted and the insertion piece 62 may be formed on the outer bottom surface 61A of the cluster block 61.

In the illustrated embodiments, the stopper portion 63 may be omitted and the inserting portion 64 may be joined directly to the lower surface 621A of the base 62A.

The escape portion 621B may be omitted from the illustrated embodiments.

Figure 15:
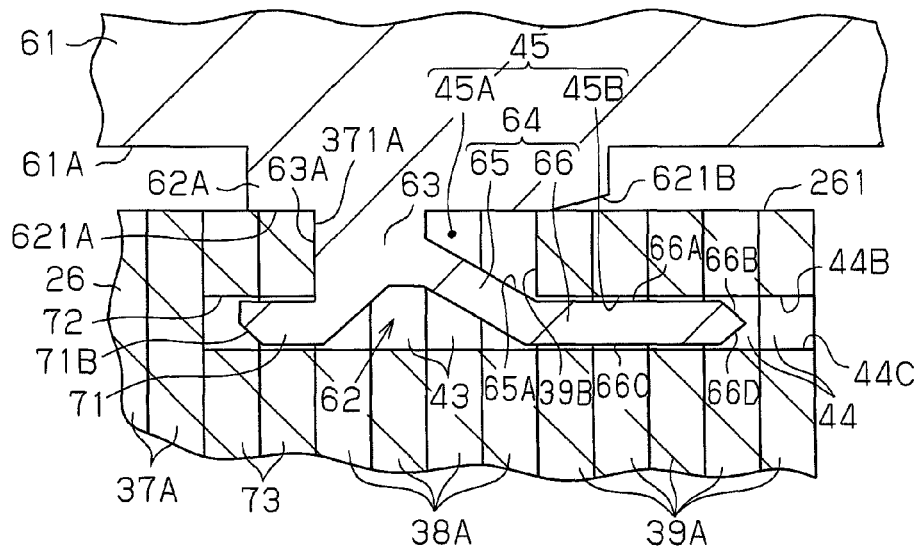
FIG. 15 is an enlarged side cross-sectional view showing an insertion piece inserted into an insertion hole according to another embodiment of the invention.

In the second embodiment, as illustrated in FIG. 15, a lower tapered surface 71B, which inclines toward the lower surface 621A of the base 62A, may be formed in the distal end portion of the engagement projection 71 at the lower surface of the engagement projection 71 opposite to the lower surface 621A of the base 62A. As a result, when the engagement projection 71 is inserted into the first insertion space 45A, the lower tapered surface 71B formed in the engagement projection 71 prevents the distal end portion of the engagement projection 71 from interference with the outer peripheral end of the corresponding first core plate 37A at the side corresponding to the first insertion space 45A. The engagement projection 71 is thus smoothly received in the first insertion space 45A.

In the second embodiment, an upper tapered surface inclining in such a manner as to be spaced from the lower surface 621A of the base 62A may be formed in the distal end portion of the engagement projection 71 at the upper surface of the engagement projection 71 facing the lower surface 621A of the base 62A. As a result, when the engagement projection 71 is disengaged from the engagement recess 72, the upper tapered surface formed in the engagement projection 71 prevents the distal end portion of the engagement projection 71 from interference with the end of the engagement recess 72 at the side corresponding to the first insertion space 45A. The engagement projection 71 is thus smoothly removed from the engagement recess 72.

In the second embodiment, the lower tapered surface 71B and the upper tapered surface may be formed in the distal end portion of the engagement projection 71.

In the illustrated embodiments, the first core plates 37A may be arranged at a position closer to the inverter 52 than the third core set 39. In this case, the opening of the second insertion space 45B facing the inverter 52 is closed.

In the illustrated embodiments, the second insertion space 45B may be formed in a manner extending along a direction diagonally crossing a radial direction of the stator core 26.

In the illustrated embodiments, the base 62A and the insertion piece 62 do not necessarily have to be formed integrally with each other but may be formed independently from each other.

In the illustrated embodiments, the base 62A and the cluster block 61 do not necessarily have to be formed integrally with each other but may be formed independently from each other.

In the illustrated embodiments, the inverter 52 is fixed to the outer surface of the end wall 12A in the accommodation space 51A. However, the inverter 52 may be fixed to the inner surface of the inverter cover 51 in the accommodation space 51A.

Figure 16:
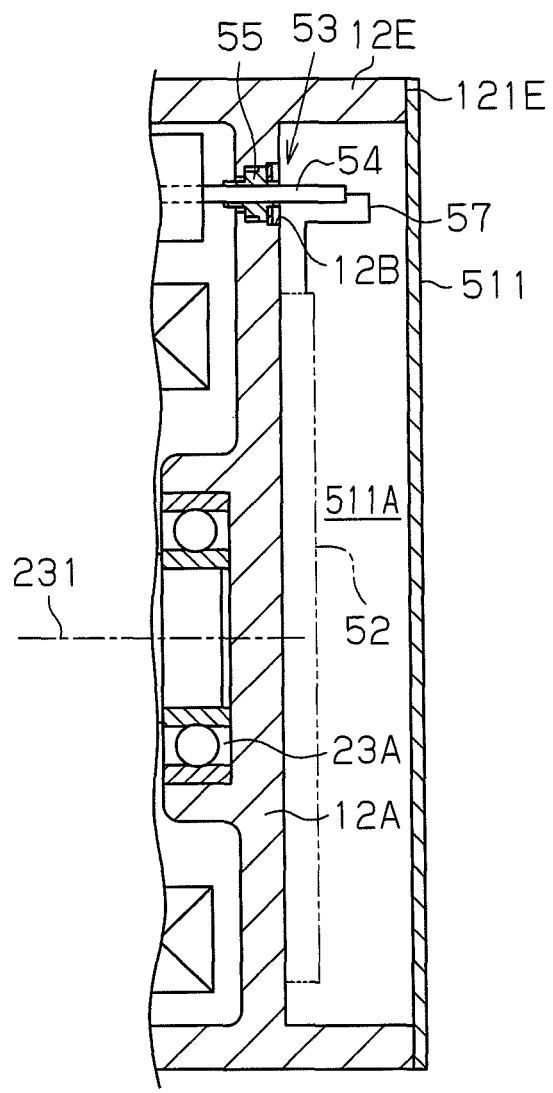
FIG. 16 is an enlarged side cross-sectional view showing a portion of the peripheral structure of a drive circuit according to another embodiment of the invention.

As illustrated in FIG. 16, an accommodation space 511A may be defined to accommodate the inverter 52. Specifically, an annular extended portion 12E extends from the entire outer peripheral end of the end wall 12A along the axial direction 231. A inverter cover 511 is fixed to an end surface 121E of the extended portion 12E. The end wall 12A, the extended portion 12E, and the inverter cover 511 thus define the accommodation space 511A. In the accommodation space 511A, the inverter 52 is fixed to the outer surface of the end wall 12A.

In the illustrated embodiments, the sealing terminal 53 is arranged in the through hole 12B after the stator core 26 is mounted in the motor housing member 12. This automatically connects the metal terminal 54 to the connection terminal 31. However, the sealing terminal 53 may be arranged in the through hole 12B prior to, for example, mounting the stator core 26 in the motor housing member 12. The stator core 26 is then arranged in the motor housing member 12 to automatically connect the metal terminal 54 to the connection terminal 31.

In the illustrated embodiments, the compressing portion 18 is not restricted to the type configured by the stationary scroll 20 and the movable scroll 21 but may be a different type such as a piston type or a vane type.

Therefore, the present examples and embodiments are to be considered as illustrative and not restrictive and the invention is not to be limited to the details given herein, but may be modified within the scope and equivalence of the appended claims.

The invention claimed is:

1. A motor-driven compressor comprising:
a housing;
a compressing portion accommodated in the housing;
an electric motor that is accommodated in the housing and serves as a drive source for the compressing portion;
a drive circuit for actuating the electric motor;
a conductive member through which the drive circuit and the electric motor are electrically connected to each other;
a lead wire extended from the electric motor;
a cluster block accommodated in the housing;
a connection terminal that is arranged in the cluster block and electrically connects the conductive member and the lead wire to each other;
a stator core that is a component of the electric motor and has an outer circumferential surface, the stator core having an insertion hole that has an opening in the outer circumferential surface of the stator core and a cornered portion in the stator core, wherein
the stator core is configured by a plurality of core plates that are stacked together,
some of the core plates have an insertion hole forming portion, and
the insertion hole is defined by the insertion hole forming portions joined by stacking the core plates that have the insertion hole forming portion, and
the cornered portion is angled such that the cornered portion extends in a first direction of the stator core and then extends in a second direction of the stator core that is different from the first direction; and
an insertion piece that is formed with the cluster block and inserted into the insertion hole via the cornered portion, wherein the cluster block is attached to the stator core by engaging the insertion piece with the insertion hole.

2. The motor-driven compressor according to claim 1, wherein the insertion piece is elastic.

3. The motor-driven compressor according to claim 2, wherein
the cluster block has an outer bottom surface facing the outer circumferential surface of the stator core, and
the insertion piece includes:
a stopper portion arranged in the insertion hole; and
an inserting portion extending from the stopper portion in a manner inclining in a direction separating from the outer bottom surface of the cluster block.

4. The motor-driven compressor according to claim 3, wherein the insertion hole has an inner surface, at least a portion of the inserting portion being held in contact with the inner surface of the insertion hole.

5. The motor-driven compressor according to claim 3, wherein the inserting portion has a tapered distal end portion, the distal end portion of the inserting portion having a thickness in a radial direction of the stator core and a tapered surface that decreases the thickness of the distal end portion toward the distal end of the inserting portion.

6. The motor-driven compressor according to claim 1, wherein the stator core further includes a receiving portion that receives load acting on the cluster block at the time when the conductive member is connected to the connection terminal.

7. The motor-driven compressor according to claim 1, wherein the insertion piece has an engagement projection, and wherein the stator core has an engagement recess engageable with the engagement projection.

8. The motor-driven compressor according to claim 1, wherein the cluster block has a maintaining portion that is held in contact with the outer circumferential surface of the stator core to maintain the posture of the cluster block.

9. The motor-driven compressor according to claim 1, wherein the stator core has a tooth that projects radially and has a width, and wherein the insertion hole is formed at a position in the stator core corresponding to the center line of the tooth in the direction of the width as viewed in a circumferential direction of the stator core.

10. The motor-driven compressor according to claim 1, further comprising:
   a rotor that is accommodated in the housing and is a component of the electric motor; and
   a rotary shaft that is accommodated in the housing and rotates integrally with the rotor,
   wherein the compressing portion, the electric motor, and the drive circuit are arranged sequentially in this order along the axial direction of the rotary shaft, the lead wire being extended from a side of the electric motor facing the compressing portion.

11. The motor-driven compressor according to claim 10, wherein the insertion hole is formed at a position closer to the drive circuit than the compressing portion in the outer circumferential surface of the stator core.

12. The motor-driven compressor according to claim 1, wherein the insertion hole has a chamfered end.

13. The motor-driven compressor according to claim 1, wherein the cluster block includes an inclined portion configured to facilitate insertion of the insertion piece into the insertion hole by causing a portion of the cluster block to contact the outer circumferential surface of the stator core when the insertion piece is inserted into the insertion hole.

14. The motor-driven compressor according to claim 1, wherein the cornered portion extends first in the radial direction of the stator core and then extends in the axial direction of the stator core.

15. The motor-driven compressor according to claim 1, wherein the cornered portion extends first in the radial direction of the stator core and then extends in a direction perpendicular to the axial direction of the stator core.

16. The motor-driven compressor according to claim 1, further comprising:
   a rotor that is accommodated in the housing and is a component of the electric motor; and
   a rotary shaft that is accommodated in the housing and rotates integrally with the rotor, wherein
   the compressing portion, the electric motor, and the drive circuit are arranged sequentially in this order along the axial direction of the rotary shaft, the lead wire being extended from a side of the electric motor facing the compressing portion,
   the housing includes a motor housing member for accommodating the electric motor, and
   the motor housing member has a tubular shape having an opening at one end, the motor housing member having a space forming portion that defines, at a position between the space forming portion and the outer circumferential surface of the stator core, a space for accommodating the cluster block in the motor housing member.

17. The motor-driven compressor according to claim 16, wherein the conductive member is arranged in the motor housing member in a state extending through the motor housing member along the axial direction of the rotary shaft, the conductive member being extended in the axial direction of the rotary shaft and connected to the connection terminal.

18. The motor-driven compressor according to claim 1, wherein
   the stator core is configured by a plurality of core plates that are stacked together,
   the insertion hole is defined by insertion hole forming portions formed in the core plates,
   the insertion hole forming portions are formed by openings punched in the corresponding core plates from a first end surface to a second end surface,
   the cornered portion extends first in the radial direction of the stator core and then in the axial direction of the stator core, and
   the first end surfaces face the corresponding second end surfaces in the core plates in the axial direction of the stator core.

19. The motor-driven compressor according to claim 1, wherein
   the stator core is configured by a plurality of core plates that are stacked together,
   the insertion hole is defined by insertion hole forming portions formed in the core plates,
   the insertion hole forming portions are formed by openings punched in the corresponding core plates from a first end surface to a second end surface,
   the cornered portion extends first in the radial direction of the stator core and then in a direction perpendicular to the axial direction of the stator core.

20. The motor-driven compressor according to claim 1, wherein the insertion hole has a stepped end.

* * * * *